United States Patent
Challenor et al.

(10) Patent No.: US 10,266,085 B2
(45) Date of Patent: Apr. 23, 2019

(54) SEAT BACK

(71) Applicant: ACRO AIRCRAFT SEATING LIMITED, Crawley (GB)

(72) Inventors: Adam Challenor, Banbury (GB); Alex Hodgkinson, London (GB); James Bowker, Crawley (GB); Joseph Conroy, Oxford (GB)

(73) Assignee: Acro Aircraft Seating Limited, Crawley (GB)

( * ) Notice: Subject to any disclaimer, the term of this patent is extended or adjusted under 35 U.S.C. 154(b) by 0 days.

(21) Appl. No.: 15/462,678

(22) Filed: Mar. 17, 2017

(65) Prior Publication Data
US 2017/0267143 A1    Sep. 21, 2017

(30) Foreign Application Priority Data

Mar. 18, 2016 (GB) .................................. 1604655.9

(51) Int. Cl.
*B60N 2/22* (2006.01)
*B60N 2/68* (2006.01)
(Continued)

(52) U.S. Cl.
CPC ............... *B60N 2/643* (2013.01); *B60N 2/22* (2013.01); *B60N 2/68* (2013.01); *B60N 2/686* (2013.01); *B64D 11/06* (2013.01); *B64D 11/064* (2014.12)

(58) Field of Classification Search
CPC ... B64D 11/06; B64D 11/064; B64D 11/0649; B60N 2/22; B60N 2/2222; B60N 2/64;
(Continued)

(56) References Cited

U.S. PATENT DOCUMENTS 4,036,527 A * 7/1977 Faul ..................... B60N 2/242
297/232
4,580,837 A * 4/1986 Bayley .................. B60N 2/665
297/362.12
(Continued)

FOREIGN PATENT DOCUMENTS

CA    2395967 A1 * 7/2001 ........... B60N 2/3084
CA    2866322 A1 * 9/2013 ............... B60N 2/68
(Continued)

OTHER PUBLICATIONS

Aliexpress (downloaded from https://pt.aliexpress.com/store/product/Garden-Egg-Chair-fiberglass-shell-eggs-outdoor-leisure-garden-chair-Peter-Ghyczy/1195082_2021077331.html), downloaded Mar. 31, 2017), 3 pp.
(Continued)

*Primary Examiner* — Ryan D Kwiecinski
(74) *Attorney, Agent, or Firm* — Klarquist Sparkman, LLP (57) ABSTRACT

Described is a seat back comprising a curved rear wall bordered by a perimeter wall projecting forward from the rear wall. The curved rear wall and perimeter wall define a cavity in front of the rear wall and between opposing surfaces of the perimeter wall. The seat back comprises an upper part and a lower part. The lower part comprises a surface of the rear wall which is curved forward toward each side wall of the lower part and curved forward toward the base of the lower part. The width of the seat back tapers from a first width towards a second width at the base of the seat back.

14 Claims, 7 Drawing Sheets

(51) Int. Cl.
  *B64D 11/06* (2006.01)
  *B60N 2/64* (2006.01)

(58) Field of Classification Search
  CPC .......... B60N 2/643; B60N 2/646; B60N 2/68;
  B60N 2/686
  See application file for complete search history.

(56) References Cited

U.S. PATENT DOCUMENTS

| | | | |
|---|---|---|---|
| 5,232,263 A | 8/1993 | D'Ull et al. | |
| 5,895,096 A * | 4/1999 | Massara | B60N 2/70 |
| | | | 297/452.18 |
| 8,733,840 B2 | 5/2014 | Westerink et al. | |
| 2004/0100138 A1 | 5/2004 | Johnson | |
| 2012/0223566 A1* | 9/2012 | Nakayama | A47C 31/02 |
| | | | 297/452.18 |
| 2012/0292967 A1 | 11/2012 | Cailleteau | |
| 2013/0241259 A1* | 9/2013 | Pozzi | B60N 2/68 |
| | | | 297/452.18 |
| 2016/0297533 A1* | 10/2016 | Le | B64D 11/0639 |
| 2017/0023346 A1* | 1/2017 | Phillips | G01B 5/24 |
| 2017/0158104 A1* | 6/2017 | Le | B60N 2/809 |
| 2017/0267143 A1* | 9/2017 | Bowker | B64D 11/064 |
| 2017/0274998 A1* | 9/2017 | Ruiz Lara | B64D 11/06 |
| 2017/0283070 A1* | 10/2017 | Hall | B64D 11/0647 |
| 2018/0079509 A1* | 3/2018 | Le | B64D 11/0639 |

FOREIGN PATENT DOCUMENTS

| | | | | |
|---|---|---|---|---|
| CN | 204978334 | | 1/2016 | |
| DE | 102009011387 A1 | * | 9/2010 | .......... B60N 2/2222 |
| DE | 102011055286 A1 | * | 4/2013 | .......... B60N 2/5825 |
| EP | 2905226 | | 8/2015 | |
| EP | 2949445 A1 | * | 12/2015 | ............. B60N 2/646 |
| GB | 2 502 948 | | 12/2013 | |
| JP | 2005297950 A | * | 10/2005 | ............... A47C 7/40 |
| WO | WO-2011097206 A2 | * | 8/2011 | ............. B64D 11/06 |
| WO | WO 2011/110875 | | 9/2011 | |
| WO | WO-2015065208 A1 | * | 5/2015 | ............... B60N 2/68 |
| WO | WO-2016128524 A1 | * | 8/2016 | ............... B60N 2/68 |
| WO | WO-2017155566 A1 | * | 9/2017 | ............. B64D 11/06 |

OTHER PUBLICATIONS

Combined Search and Examination Report issued by the Intellectual Property Office of the United Kingdom for UK Patent Application No. GB 1604655.9, 9 pp.

Extended European Search Report dated Sep. 21, 2017, by the European Patent Office for corresponding European Patent Application No. 17161559.4, 8 pp.

* cited by examiner

SEAT BACK

CROSS REFERENCE TO RELATED APPLICATION

This application claims priority to United Kingdom Patent Application No. GB 1604655.9, filed Mar. 18, 2016, which is incorporated herein by reference in its entirety.

TECHNICAL FIELD

The present invention relates to seat backs, in particular to seat backs for aircraft seats.

BACKGROUND ART

Various types of aircraft seat are known which generally comprise a seat base, a seat back and one or more armrests. In order to satisfy airline requirements, it is beneficial to make aircraft seats lighter and to minimise the space that they occupy on an aircraft.

A particular problem occurs with the provision of adequate legroom, especially in economy class where space is at a premium.

It is, therefore, an object of the present invention to seek to alleviate the above identified problems.

SUMMARY OF THE INVENTION

According to one aspect of the present invention, there is provided a seat back, the seat back comprising a curved rear wall bordered by a perimeter wall projecting forward from the rear wall, said curved rear wall and perimeter wall defining a cavity in front of the rear wall and between opposing surfaces of the perimeter wall, wherein the seat back comprises an upper part and a lower part, said lower part comprising a surface of the rear wall which is curved forward toward each side wall of the lower part and curved forward toward the base of the lower part, wherein the width of the seat back tapers from a first width towards a second width at the base of the seat back.

Preferably, the lower part comprises a convex surface of the rear wall which is curved forward toward each side wall of the lower part and curved forward toward the base of the lower part.

Preferably, the perimeter wall of the lower part is substantially semi-circular.

Preferably, the lower part of the seat back is substantially semi-circular.

Preferably, the depth of the cavity is greater in the lower part than in the upper part of the seat back.

Preferably, the depth of the cavity is greater at the base of the seat back than in the upper part of the seat back.

Preferably, the depth of the perimeter wall is greater in the lower part than in the upper part of the seat back.

Preferably, the depth of the perimeter wall is greater at the base of the seat back than in the upper part of the seat back.

Preferably, the perimeter wall is provided around at least the side edges and upper edge of the rear wall.

Preferably, the perimeter wall is provided around substantially all of the rear wall.

Preferably, "around substantially all of the rear wall" means around at least about 90% of the rear wall, preferably, around at least about 95%, preferably at least about 98%, preferably at least about 99% of the rear wall.

Preferably, the perimeter wall is provided around all of the rear wall.

Preferably, the rear edge of the perimeter wall slopes forward in the lower part of the seat back.

As a result, it will be appreciated that, when viewed from the side, the lower part of the seat back protrudes forward at its base.

Preferably, the rear wall does not cross the space between opposing surfaces of the perimeter wall.

Preferably, the upper part has a surface which is curved toward each side wall of the upper part.

Preferably, the upper part has a convex surface which is curved toward each side wall of the upper part.

Remarkably, the shape of the seat back of the present invention maximises leg room for a passenger sitting in a seat positioned behind a seat incorporating a seat back of the present invention. This is particularly the case due to the curved nature of the lower part of the seat back. In addition, due to the position of the cavity defined by the rear and perimeter walls, cushioning for supporting a person leaning against the seat back can be provided within this cavity, rather than in front of the structure of the seat back, as is commonly provided with known seat backs. This means that a person sits further back in the seat than with known seat backs and so maximises leg room further.

Preferably, the seat back comprises a support disposed within the cavity, said support for supporting the back of a person leaning against the front of the seat back.

Preferably, the support comprises a deformable material, preferably a foam material.

Preferably, the support comprises a resilient material.

Preferably, the support fills substantially all of the cavity.

Preferably, "substantially all of the cavity" means at least about 90% of the cavity, preferably, around at least about 95%, preferably at least about 98%, preferably at least about 99% of the cavity.

Preferably, the support fills all of the cavity.

According to another aspect of the present invention, there is provided a seat back, the seat back comprising a rear wall bordered by a perimeter wall projecting forward from the rear wall, said rear wall and perimeter wall defining a cavity in front of the rear wall and between opposing surfaces of the perimeter wall, wherein the seat back comprises a deformable material disposed within the cavity, said deformable material for supporting the back of a person leaning against the front of seat back.

Preferably, the rear wall is a curved rear wall.

Preferably, the rear wall is a curved rear wall comprising a convex surface.

Preferably, the seat back comprises an upper part and a lower part, said lower part comprising a surface which is curved forward toward each side of the lower part and curved forward toward the base of the lower part, wherein the width of the seat back tapers from a first width towards a second width at the base of the seat back.

Preferably, the seat back comprises an upper part and a lower part, said lower part comprising a convex surface which is curved forward toward each side of the lower part and curved forward toward the base of the lower part, wherein the width of the seat back tapers from a first width towards a second width at the base of the seat back.

Preferably, the seat back comprises a first connector, a second connector and a securing means, wherein the first and second connectors are for securing the seat back in pivotable engagement with a seat, preferably the frame of a seat, and the securing means is for controlling pivotal movement of the seat back relative to the seat.

Preferably, the first and second connectors are positioned at either side of the seat back.

Preferably, the upper part of the seat back is above the first and second connectors.

Preferably, the lower part of the seat back is below the first and second connectors.

Preferably, the width of the seat back tapers from a first width between the first and second connectors towards a second width at the base of the seat back.

Preferably, the securing means comprises a third connector for connection to the seat base, the frame or a recline mechanism of a seat.

Preferably, the securing means is for controlling pivotal movement of the seat back relative to the frame or the seat base.

Preferably, the securing means comprises a recline mechanism.

In embodiments wherein the securing means comprises a third connector for connection to a recline mechanism, it will be appreciated that the recline mechanism is used to alter the pivotal position of the seat back about the first and second connectors relative to the frame or seat base, and thus recline or alternatively straighten the seat back relative to the seat base. That is, when the seat back is straightened relative to the seat base, the seat back is returned to an upright position.

In embodiments wherein a recline mechanism is not provided, the third connector is for preventing pivotal movement of the seat back relative to the frame or seat base.

Remarkably, the present invention also provides a seat back that can be pivoted forward to improve access to rear parts of the seat back, seat base and/or frame. In this way, release of the securing means permits forward pivotal movement of the seat back to a maintenance position.

As such, in one embodiment of the invention, it is preferred that the seat back is moveable between a seating position and a maintenance position.

Preferably, the third connector comprises a first mating part for engagement with a second mating part on the frame, seat base or a recline mechanism Preferably, the first mating part is a female mating part and the second mating part is a male mating part. Alternatively, the first mating part is a male mating part and the second mating part is a female mating part.

Preferably, the securing means is a releasable securing means.

Preferably, the third connector is releasably securable to the frame, seat base or a recline mechanism of a seat.

Preferably, the third connector is releasably securable to the frame, seat base or a recline mechanism of a seat by a removable bolt or screw.

Preferably, the securing means is provided toward or at the base of the seat back.

Preferably, the securing means is centrally positioned on the seat back with respect to the width of the seat back.

This is particularly advantageous because it allows for the seat to be non-handed; i.e. the seat is not limited to either right-hand or left-hand use. As a result, an actuator for the recline mechanism can be provided centrally under the front edge of the seat base.

According to another aspect of the present invention, there is provided a seat comprising a seat back as described herein.

Preferably, the seat comprises a seat base, a seat frame and a seat back as described herein.

Preferably, the seat comprises a mating part for engagement with the third connector of the seat back.

Preferably, the frame or seat base comprises a mating part for engagement with the third connector of the seat back.

Preferably, the seat comprises a centrally positioned recline mechanism.

Preferably, the seat is a vehicle seat, preferably an aircraft seat.

According to a further aspect of the present invention, there is provided a row of seats comprising a plurality of seats as described herein.

It will be appreciated that reference to "one or more" includes reference to "a plurality".

Within this specification, the term "about" means plus or minus 20%, more preferably plus or minus 10%, even more preferably plus or minus 5%, most preferably plus or minus 2%.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein and vice versa.

BRIEF DESCRIPTION OF THE DRAWINGS

Example embodiments of the present invention will now be described with reference to the accompanying figures, in which.

DETAILED DESCRIPTION

The present invention relates to a seat back, particularly to a seat back for an aircraft seat.

Figure 1:
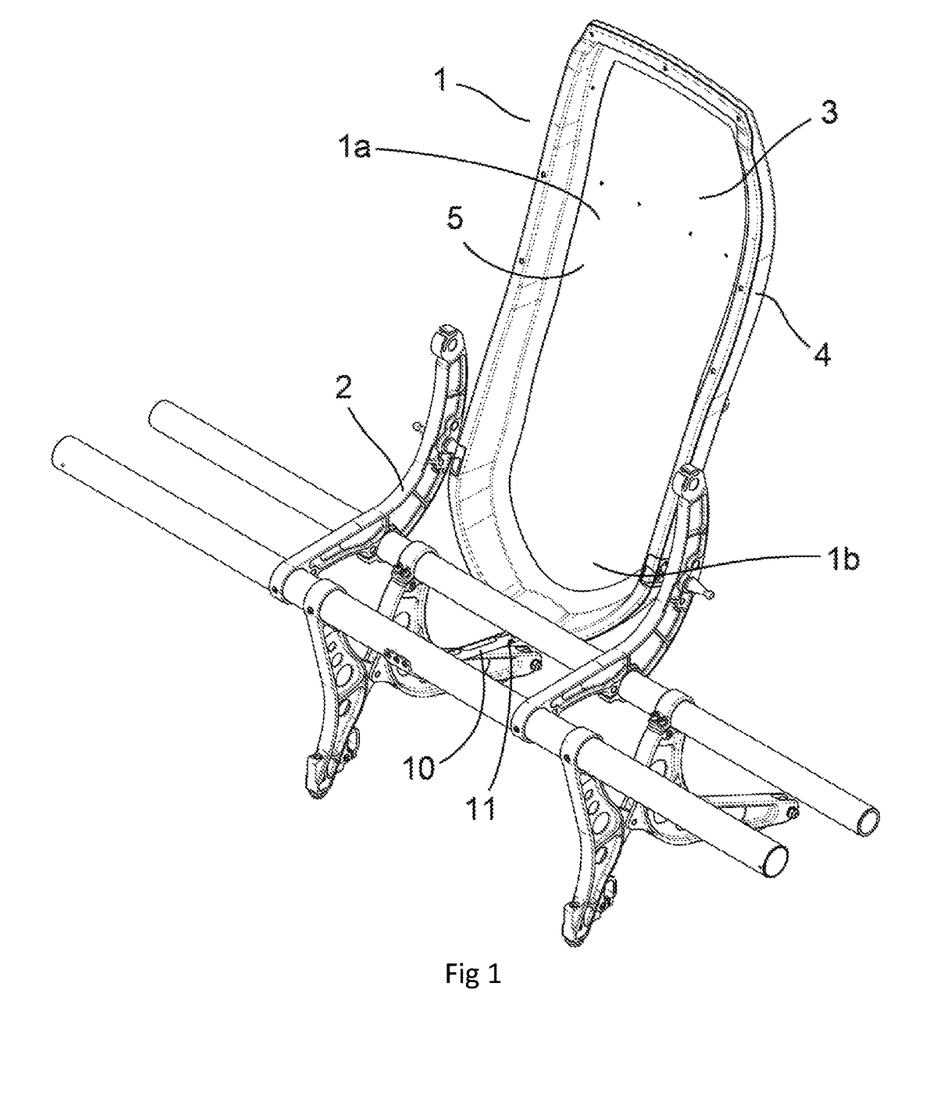
FIGS. 1 and 2 show a seat back in accordance with an embodiment of the present invention.

With reference to FIG. 1, there is shown a seat back 1 attached to a seat frame 2. Whilst the seat base is omitted to show features of the seat back 1, it will be appreciated that the seat base is the part of the seat upon which a person would sit, with the seat back 1 supporting the back of a person.

The seat back comprises a curved rear wall 3 bordered by a perimeter wall 4, said curved rear wall 3 and perimeter wall 4 defining a cavity 5 in front of the rear wall 3 and between opposing surfaces 4a, 4b of the perimeter wall. The "front" face of the seat back 1 is understood to be the face on which a person would rest their back in use. The seat back 3 comprises an upper part 1a and a lower part 1b. The lower part 1b has a convex surface on the rear wall, which is curved forward toward each side wall 4a, 4b of the lower part and curved forward toward the base 6 of the lower part 1b. In addition, the width of the seat back 1 tapers from a first width, between first and second connectors, 7, 8, towards a second width at the base 6 of the seat back 1.

The upper part 1a has a convex surface which is curved toward each side wall 4a, 4b of the upper part 1a.

The depth of the cavity 5 is greater in the lower part 1b than in the upper part 1a of the seat back 1. This is despite the rear wall 3 curving forward toward the base 6 of the lower part 1b and also the perimeter wall 4 sloping forward in the lower part 1*b*. The greater depth allows additional support material 12 to be provided in the lower part 1*b*, thus maximising passenger comfort, whilst at the same time maintaining an increase in leg room.

Figure 2:
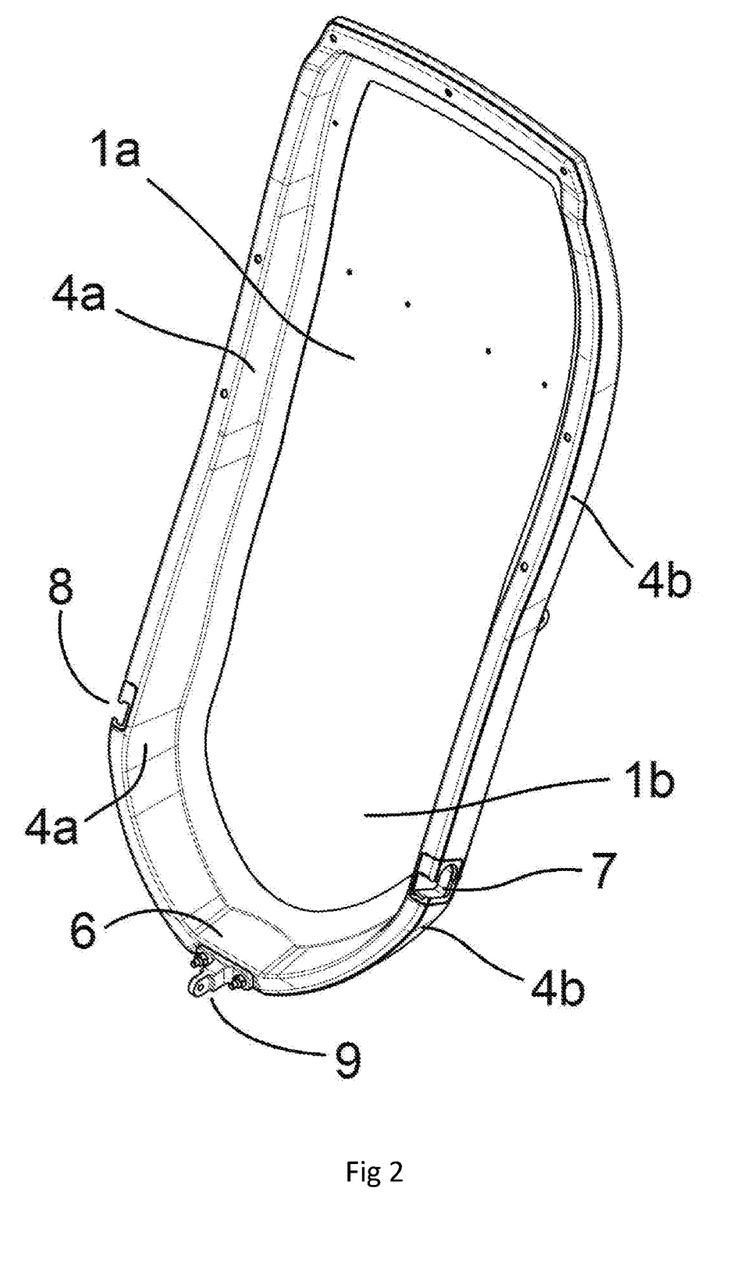

With reference to FIG. 2, the seat back 1 comprises a first connector 7, a second connector 8 and a securing means 9 in the form of a third connector for connection to a recline mechanism 10. The third connector 9 is releasably securable to the recline mechanism 10 by a removable bolt 11.

The first and second connectors 7, 8 permit the seat back 1 to pivot relative to the frame 2. When the seat back 2 is connected to the frame 2 via the third connector 9, pivotable movement of the seat back 1 is then controlled by the recline mechanism 10. Whilst a recline mechanism 10 is shown in the present embodiment, it will be appreciated that the recline mechanism 10 could be an extension of the frame 2 for preventing pivotable movement of the seat back 1 in a fixed-back, non-recline, embodiment.

The securing means 9 is provided at the base 6 of the seat back 1 and is centrally positioned with respect to the width of the seat back 1. This allows the width of the seat back 1 to taper from a first width between the first and second connectors 7, 8 towards a second width at the securing means 9.

As noted above, this is particularly advantageous because it allows for increased leg room either side of the lower part of the seat back 1 for a passenger sitting in a seat behind. In addition, due to the central location of the third connector 9, the seat is non-handed; i.e. the seat is not limited to either right-hand or left-hand use. As a result, an actuator (not shown) for the centrally positioned recline mechanism 10 can be provided centrally under the front edge of the seat base (not shown).

Figure 3:
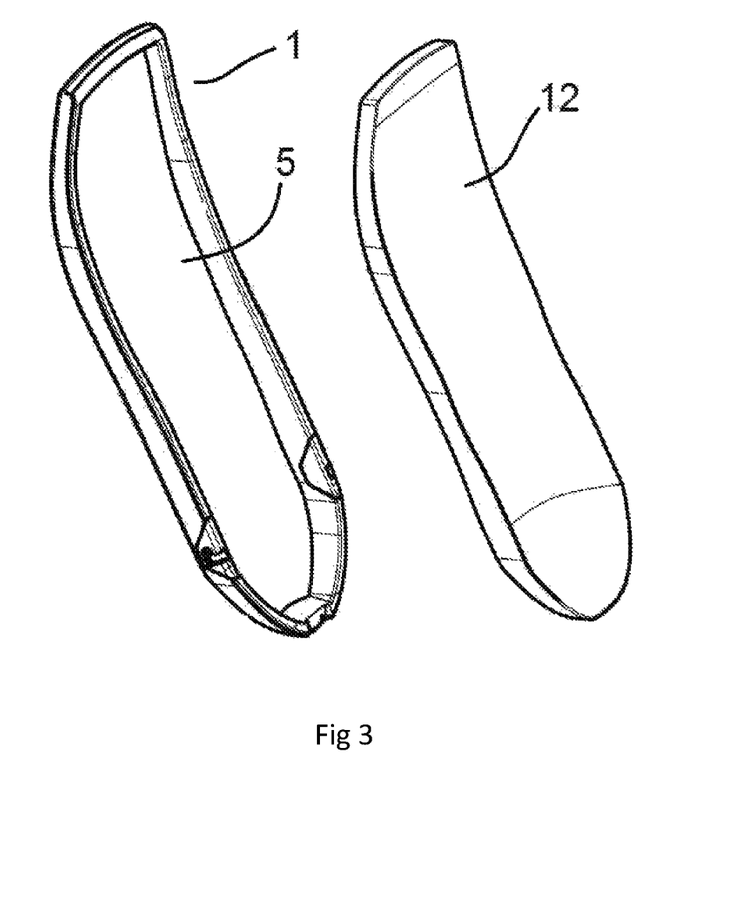
FIG. 3 shows an exploded view of a seat back of the present invention and a support for positioning within the cavity of the seat back.
Figure 4:
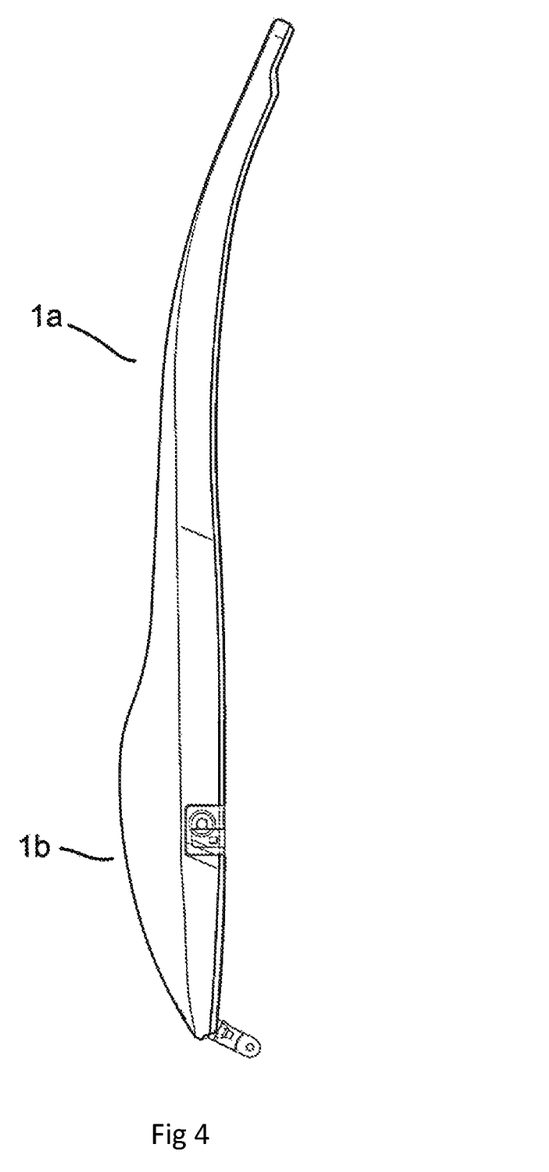
FIGS. 4, 5 and 6 show the curved profile of the rear wall in a side view (FIG. 4), view from the base (FIG. 5) and view from the top (FIG. 6)
Figure 5:
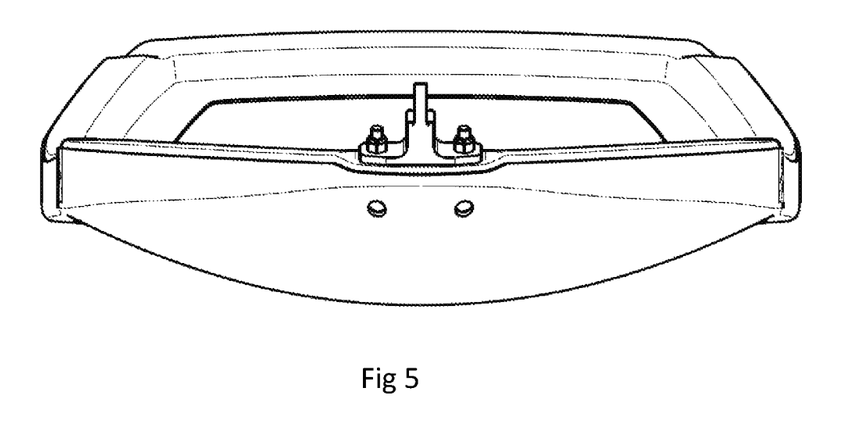
Figure 6:
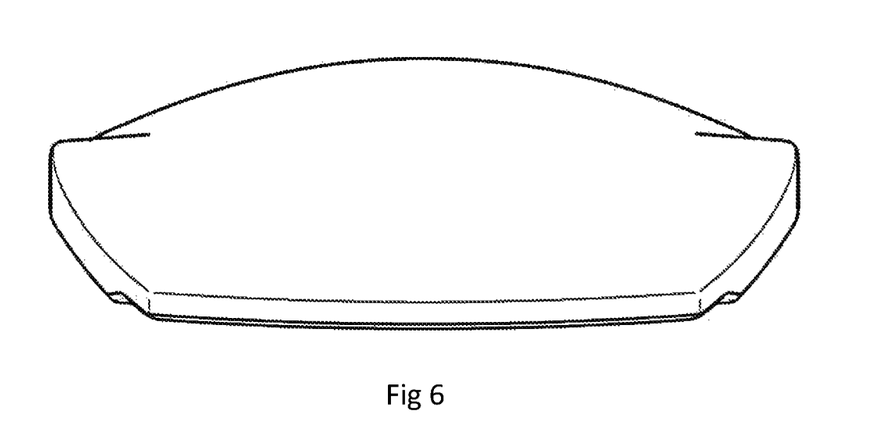
Figure 7A:
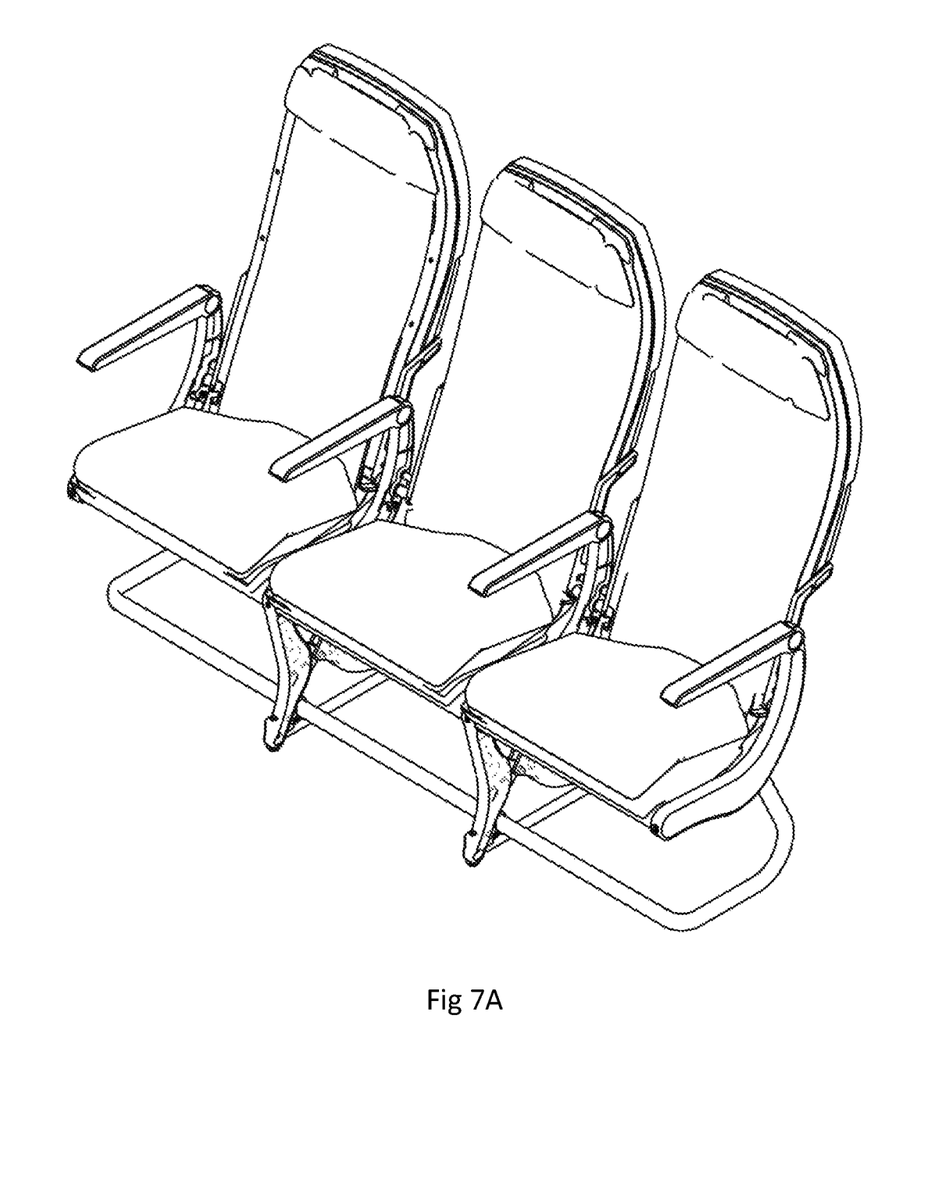
FIGS. 7A and 7B show a row of seats comprising the seat back.
Figure 7B:
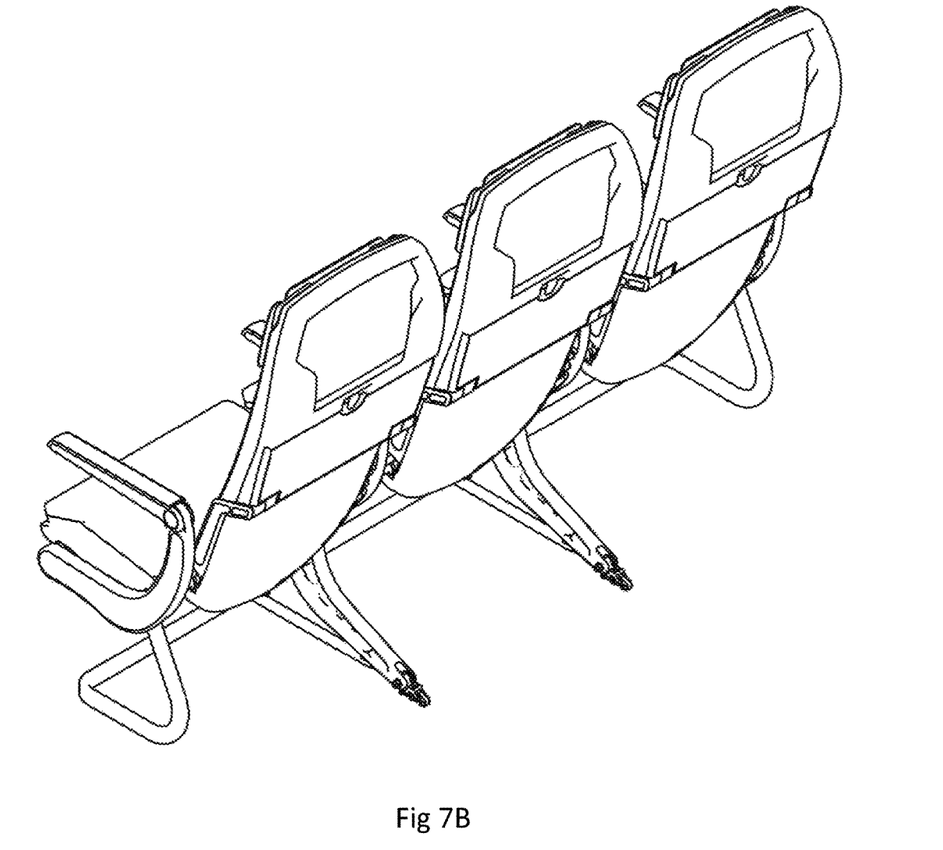

With reference to FIG. 3, the seat back 1 comprises a support 12 disposed within the cavity 5 which is for supporting the back of a person leaning against the front of the seat back 1. In the example shown, the support is a foam insert for positioning within the cavity.

Since the rear wall does not cross the space between opposed surfaces of the perimeter wall, use of the space provided by the cavity is maximised.

Due to the position of the cavity 5 defined by the rear 3 and perimeter 4 walls, cushioning 12 for supporting a person leaning against the seat back 1 can be provided within this cavity 5, rather than in front of the structure of the seat back, as is commonly provided with known seat backs. This means that a person sits further back in the seat than with known seat backs and so maximises leg room further.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications are covered by the appended claims.

The invention claimed is:

1. A seat back, the seat back comprising a curved rear wall bordered by a perimeter wall projecting forward from the rear wall, said curved rear wall and perimeter wall defining a cavity in front of the rear wall and between opposing surfaces of the perimeter wall, wherein the seat back comprises an upper part and a lower part, said lower part comprising a surface of the rear wall which curves in a direction toward side walls of the lower part and curves in a direction toward a base of the lower part, wherein a width of the seat back tapers from a first width towards a second width at the base of the seat back, wherein the seat back comprises a first connector, a second connector and a securing means, wherein the first and second connectors are for securing the seat back in pivotable engagement with a seat and the securing means is for controlling pivotal movement of the seat back relative to the seat base, wherein the first and second connectors are positioned at either side of the seat back, and the securing means is centrally positioned on the seat back with respect to the width of the seat back.

2. A seat back according to claim 1, wherein a depth of the cavity is greater in the lower part than in the upper part of the seat back.

3. A seat back according to claim 1, wherein a rear edge of the perimeter wall slopes forward in the lower part of the seat back.

4. A seat back according to claim 1, wherein the first and second connectors are for securing the seat back in pivotable engagement with a frame of the seat.

5. A seat back according to claim 1, wherein the upper part of the seat back is above the first and second connectors.

6. A seat back according to claim 1, wherein the lower part of the seat back is below the first and second connectors.

7. A seat back according to claim 1, wherein the width of the seat back tapers from a first width between the first and second connectors towards a second width at the base of the seat back.

8. A seat back according to claim 1, wherein the securing means comprises a third connector for connection to the seat base, the frame or a recline mechanism of a seat.

9. A seat back according to claim 1, wherein the securing means comprises a recline mechanism.

10. A seat back according to claim 1, wherein the securing means is a releasable securing means.

11. A seat back according to claim 1, wherein the lower part comprises a convex surface of the rear wall which is curved forward toward each side wall of the lower part and curved forward toward the base of the lower part.

12. A seat comprising a seat back according to claim 1.

13. A seat according to claim 12, wherein the seat comprises a centrally positioned recline mechanism.

14. A seat according to claim 12 comprising a mating part for engagement with a third connector of the seat back.

* * * * *